(12) United States Patent
Hosbach et al.

(10) Patent No.: US 9,227,541 B2
(45) Date of Patent: Jan. 5, 2016

(54) COMPOSITE MODULAR REAR SEAT STRUCTURE FRAME

(71) Applicant: Ford Global Technologies, LLC, Dearborn, MI (US)

(72) Inventors: Christian J. Hosbach, Allen Park, MI (US); Adam Sachs, Oak Park, MI (US); Johnathan Andrew Line, Northville, MI (US); Kevin VanNieulande, Fraser, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 71 days.

(21) Appl. No.: 14/054,873

(22) Filed: Oct. 16, 2013

(65) Prior Publication Data

US 2015/0102650 A1     Apr. 16, 2015

(51) Int. Cl.
*A47C 7/02*      (2006.01)
*B60N 2/68*      (2006.01)

(52) U.S. Cl.
CPC ........................ *B60N 2/68* (2013.01)

(58) Field of Classification Search
CPC .... B60N 2/68; B60N 2/682; B60N 2002/684; B60N 2/686
See application file for complete search history.

(56) References Cited

U.S. PATENT DOCUMENTS

| | | | | |
|---|---|---|---|---|
| 4,365,840 A | * | 12/1982 | Kehl | A47C 4/02 297/232 |
| 4,493,505 A | * | 1/1985 | Yamawaki | B60N 2/3013 296/63 |
| 5,547,259 A | * | 8/1996 | Fredrick | 297/452.18 |
| 5,568,959 A | | 10/1996 | Weber et al. | |
| 5,676,423 A | * | 10/1997 | Pedronno | B60N 2/686 297/378.1 |
| 5,826,946 A | * | 10/1998 | Matthews et al. | 297/452.57 |
| 6,106,071 A | * | 8/2000 | Aebischer et al. | 297/452.18 |
| 6,199,252 B1 | | 3/2001 | Masters et al. | |
| 6,199,948 B1 | | 3/2001 | Bush et al. | |
| 6,347,836 B1 | * | 2/2002 | Hayotte | B60N 2/20 297/378.1 |
| 6,817,673 B2 | | 11/2004 | Walker et al. | |
| 7,472,959 B1 | | 1/2009 | Ratza et al. | |
| 8,998,316 B2 | * | 4/2015 | Naughton | 29/527.1 |
| 2011/0018329 A1 | * | 1/2011 | Galbreath et al. | 297/452.18 |
| 2011/0316320 A1 | * | 12/2011 | Kulkarni et al. | 297/452.48 |
| 2013/0082504 A1 | | 4/2013 | Archambault | |
| 2013/0093226 A1 | * | 4/2013 | Mitsuhashi et al. | 297/232 |

OTHER PUBLICATIONS

Specialised Orthotic Services, "3D Modular Seating System User's Manual," Issue 1 (28 Pages, Date Unknown).

* cited by examiner

*Primary Examiner* — Philip Gabler
(74) *Attorney, Agent, or Firm* — Vichit Chea Price Heneveld LLP (57) ABSTRACT

A vehicle seating assembly includes a plurality of horizontal members, a plurality of vertical members, and a plurality of corner members, which define a seat frame. The plurality of corner members are configured to snap-fit into the plurality of horizontal and vertical members. A seatback is disposed behind the seat frame. A low-pressure compression mold is disposed over the seat frame and defines at least one open section. A subassembly is disposed over the compression mold, defining a center seat and including at least one cushion attachment support disposed adjacent to the at least one open section. A seat cushion insert is operably coupled to the at least one cushion attachment support and is disposed over the at least one open section and defining a side seat.

19 Claims, 5 Drawing Sheets

COMPOSITE MODULAR REAR SEAT STRUCTURE FRAME

FIELD OF THE INVENTION

The present invention generally relates to a vehicle seating assembly, and more particularly to a vehicle seating assembly having a composite modular seat frame design.

BACKGROUND OF THE INVENTION

Vehicles that include the modular seat structure frame design provide increased comfort and value to the consumer.

SUMMARY OF THE INVENTION

According to one aspect of the present invention, a vehicle seating assembly includes a plurality of horizontal members, a plurality of vertical members, and a plurality of corner members, which define a seat frame. The plurality of corner members are configured to snap-fit into the plurality of horizontal and vertical members. A seatback is disposed behind the seat frame. A low-pressure compression mold is disposed over the seat frame and defines at least one open section. A subassembly is disposed over the compression mold, defining a center seat and including at least one cushion attachment support disposed adjacent to the at least one open section. A seat cushion insert is operably coupled to the at least one cushion attachment support and is disposed over the at least one open section and defining a side seat.

According to another aspect of the present invention, a vehicle seating assembly includes a seatback. A seat frame is disposed on the seatback and includes a horizontal member, a vertical member, and a corner member configured to snap-fit together. A compression mold is disposed over the seat frame. A subassembly is disposed over the compression mold, defining a center seat and having a cushion attachment support. A seat cushion insert is operably coupled to the cushion attachment support and defines a side seat.

According to yet another aspect of the present invention, a vehicle seating assembly includes a seat frame having a horizontal member. A vertical member includes a female receiving slot for a male insert portion of a corner member. A compression mold is disposed over the seat frame. A subassembly is disposed over the compression mold, defining a center seat and includes a cushion attachment support. A seat cushion insert is operably coupled to the cushion attachment support and defines a side seat.

These and other aspects, objects, and features of the present invention will be understood and appreciated by those skilled in the art upon studying the following specification, claims, and appended drawings.

DETAILED DESCRIPTION OF EMBODIMENTS

Figure 1:
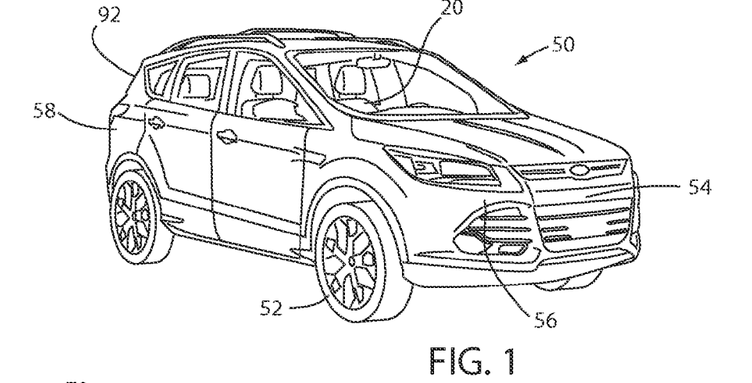
FIG. 1 is a front perspective view of a vehicle having a vehicle seat according to one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to the embodiments shown in FIGS. 1-11, reference number 20 generally designates a vehicle seating assembly which includes a plurality of horizontal members 22 and a plurality of vertical members 24. Additionally, the vehicle seating assembly 20 includes a plurality of corner members 26. The plurality of corner members 26 are operably coupled with a plurality of horizontal members 22 and the plurality of vertical members 24 via a weld-free, snap-fit engagement in order to define a seatback frame 28. A low pressure compression molded back panel 30 is operably coupled to a rear 32 of the seatback frame 28. Additionally, a subassembly 34 is disposed over the low pressure compression molded back panel 30 and defines a center seatback 36. The subassembly 34 further includes at least one cushion attachment support 38 disposed adjacent to at least one open section 40. A seatback cushion insert 42 is operably coupled to the at least one cushion attachment support 38 and is disposed over the at least one open section 40 and defines a side seatback 44.

Figure 2:
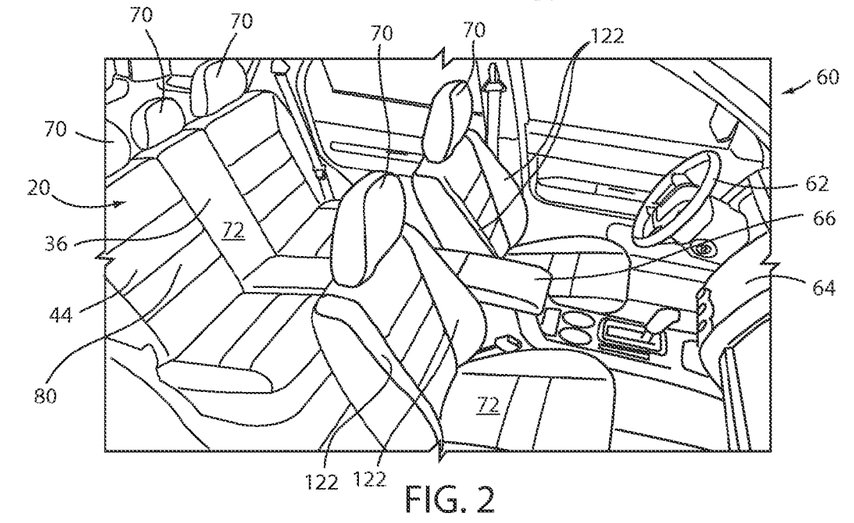
FIG. 2 is a top perspective view of a vehicle interior having a vehicle seat according to one embodiment of the present invention.

Referring again to FIG. 1, a vehicle 50 includes the vehicle seating assembly 20 and also includes other features, such as multiple wheels 52, a bumper 54, a front end 56, and a rear end 58. The vehicle 50 may be of any type, including a compact vehicle, a mid-size vehicle, a sport utility vehicle, a mini or full size van, or any type of truck. As illustrated in the embodiment of FIG. 2, an interior 60 of the vehicle 50 may include multiple vehicle seating assemblies 20. The vehicle seating assembly 20 of the present invention as illustrated in the embodiment of FIG. 2, is generally a rear passenger vehicle seat. However, it is also contemplated that the vehicle seating assembly 20 may be a front passenger vehicle seat having a driver's seat, passenger's seat and a center seat. The interior 60 of the vehicle 50 may also include other features, such as a steering wheel 62, a dashboard 64, a center console 66 for extra storage, a glove box, etc. The interior 60 of the vehicle 50 may also include multiple vehicle seating assemblies 20 such that both the rear passenger seat and the front driver/passenger seat are produced according to the present invention. However, it is also contemplated that the vehicle interior 60 may only include a single vehicle seating assembly 20, which includes the modular seat frame design.

Figure 3:
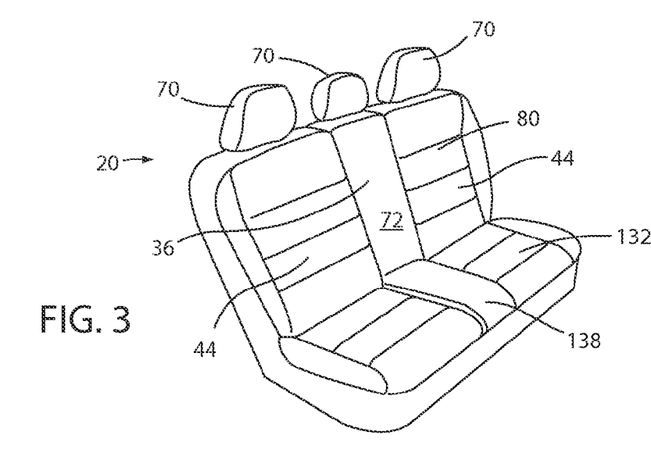
FIG. 3 is a front perspective view of a vehicle seat according to one embodiment of the present invention.

Referring now to the embodiment shown in FIG. 3, the vehicle seating assembly 20 includes the center seatback 36 and at least one, and usually two, side seatbacks 44 disposed on each side of the center seatback 36. The vehicle seating assembly 20 may also include a headrest 70 and a coverstock 72. The coverstock 72 is disposed completely over the vehicle seating assembly 20. The coverstock 72 is configured to provide a uniform look and feel to the vehicle seating assembly 20. The coverstock 72 also forms a passenger engagement surface on a top surface of the vehicle seating assembly 20.

Figure 4:
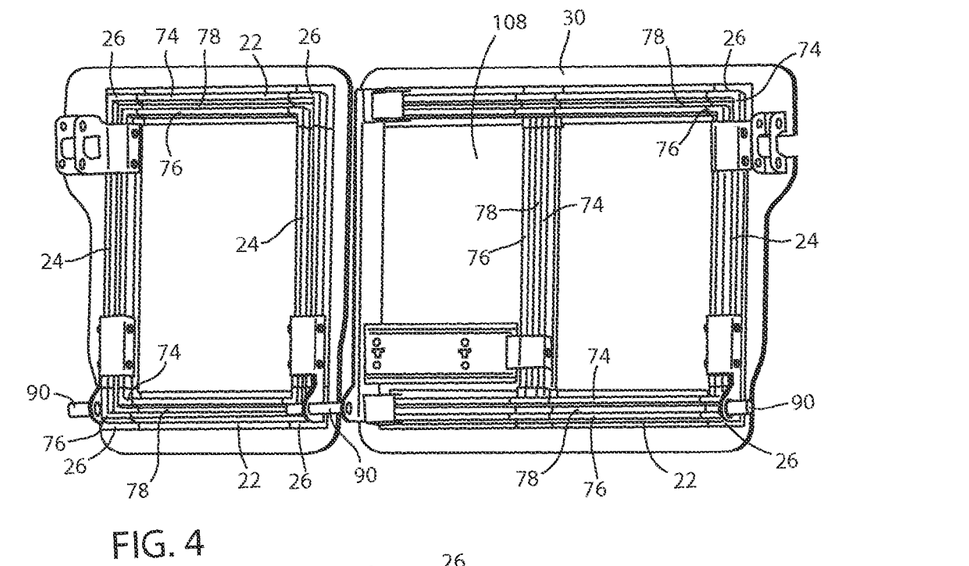
FIG. 4 is a front elevational view of one embodiment of a modular seatback structure frame.

Referring now to the embodiment shown in FIG. 4, the vehicle seating assembly 20 includes the seatback frame 28, which includes the plurality of horizontal members 22, the plurality of vertical members 24, and the plurality of corner members 26. The corner members 26 operably couple with both the horizontal members 22 and the vertical members 24. The corner members 26 and the horizontal and vertical members 22, 24 are generally coupled by a snap-fit engagement mechanism. The snap-fit engagement mechanism does not require welding or other further fixing mechanisms. The snap-fit engagement provides a stable engagement in order to provide the seatback frame 28 with sufficient strength and rigidity to support the remainder of the vehicle seating assembly 20 and the vehicle passenger seated on the vehicle seating assembly 20. The horizontal and vertical members 22, 24 are generally rectangular members. However, as illustrated in the embodiment shown in FIG. 4, the horizontal and vertical members 22, 24, may include a first rib portion 74, a second rib portion 76, and a channel portion 78 disposed between the first rib portion 74 and the second rib portion 76. Moreover, the corner members 26 also includes a first rib 74 and a second rib 76 having the channel 78 disposed between the first rib 74 and the second rib 76. When the horizontal and vertical members 22, 24 are engaged with the corner members 26, the first rib 74 of the horizontal member 22 aligns with the first rib 74 of the corner member 26 which also aligns with the first rib 74 of the vertical member 24. Similarly, the second rib 76 of the horizontal member 22 aligns with the second rib 76 of the corner member 26 and the second rib 76 of the vertical member 24 when the corner member 26 is engaged with the horizontal member 22 and the vertical member 24. As such, the channel portion 78 of each of the vertical member 24, horizontal member 22, and corner member 26 align forming the continuous channel 78 around the seatback frame 28. However, it is also contemplated that the horizontal members 22, the vertical members 24, and the corner members 26 may have more or less than two ribs and have more or less than one channel, as known by one of ordinary skill in the art.

Referring again to the embodiment illustrated in FIG. 4, both the horizontal and vertical members 22, 24 may be configured to have varying lengths based upon the height and width of the desired seatback frame 28. Various lengths of horizontal and vertical members 22, 24 are interchangeable such that horizontal and vertical members 22, 24 of any length snap-fit into the corner members 26 and define the seatback frame 28. As shown in the embodiment illustrated in FIG. 4, the plurality of horizontal and vertical members 22, 24 may create a rectangular seatback frame 28, and more specifically, three rectangular seatback frames 28 which define frames for the two side seatbacks 44 and the center seatback 36. However, it is also contemplated that the horizontal and vertical members 22, 24 can use the snap-fit attachment method to create the seatback frame 28 in any open or closed geometric shape, such as square, triangular, or any other shape as known by one of ordinary skill in the art.

Referring again to the embodiment shown in FIG. 4, the low pressure compression molded back panel 30 is operably coupled to the rear 32 of the seatback frame 28. The low pressure compression molded back panel 30 provides the strength and support necessary for a seatback portion 80 of the vehicle seating assembly 20, and provides a back surface for the seatback frame 28 to be mounted onto. The low pressure compression molded back panel 30 also acts as a close out finished panel to the vehicle seating assembly 20. The low pressure compression molded back panel 30 is a generally flat back panel which extends across the entire rear 32 of the seatback frame 28. In the embodiment illustrated in FIG. 4, the low pressure compression molded back panel 30 is generally rectangular. However, it is also contemplated that the low pressure compression molded back panel 30 may be of any other shape as known by one of ordinary skill in the art in order to provide structural rigidity to the vehicle seating assembly 20. Additionally, as illustrated in FIG. 4, the low pressure compression molded back panel 30 may have two separate sections such that one side seat includes the low pressure compression molded back panel 30 and a separate back panel is disposed on the rear 32 of the seatback frame 28, defining a back surface for the center seatback 36 and the opposite side seatback 44.

Referring again to the embodiments shown in FIG. 4, the molded back panel 30 may be operably coupled to the seatback frame 28 by brackets. The brackets, as illustrated in the embodiment shown in FIG. 4, generally are disposed on the vertical members 24. In the embodiment illustrated in FIG. 4, the seatback frame 28 includes two brackets on each vertical member 24. However, it is also contemplated that the brackets may be disposed on both the horizontal and vertical members 22, 24 or on the horizontal member 22 alone. It is also contemplated that the seatback frame 28 may include more or less than two brackets on each horizontal or vertical member 22, 24. The brackets provide additional support for the seatback frame 28 and affix the molded back panel 30 onto the seatback frame 28. It is contemplated that the brackets may be reinforcing brackets such that the brackets are disposed over the snap-fit engagement mechanism between the corner member 26 and the vertical member 24 reinforcing the snap-fit engagement. However, it is also contemplated that the brackets may be disposed only on the vertical members 24, or only on the horizontal members 22 and do not contact the corner members 26. Additionally, the open shell construction of the seatback frame 28 and the molded back panel 30 allows for storage of other components including a climate control system, a heater mat, or other electronic functional devices to be stored beneath the seatback frame 28.

Figure 5:
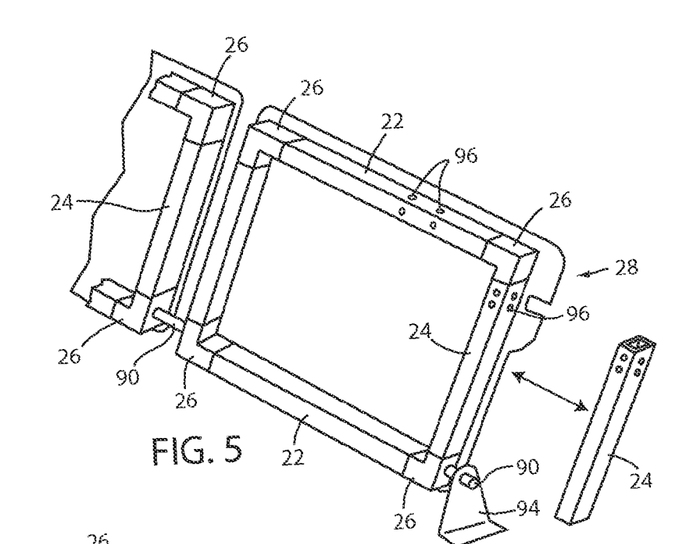
FIG. 5 is a front perspective view of a modular seatback structure frame according to another embodiment of the present invention.

Referring now to another embodiment generally illustrated in FIG. 5, the vehicle seating assembly 20 may also include a torque tube 90 disposed through a horizontal member 22 of the seatback frame 28. The torque tube 90 is configured to allow the seatback frame 28 to fold downward in order to allow the vehicle passenger access to a vehicle trunk 92 from the interior 60 of the vehicle 50. In the embodiment illustrated in FIG. 5, the torque tube 90 is disposed completely through the seatback frame 28 such that the torque tube 90 extends outside of both side seatbacks 44. The torque tube 90 is operably coupled to at least one bracket 94, which holds the torque tube 90 in place and secures the torque tube 90 to the seatback frame 28. As shown in the embodiment illustrated in FIG. 5, the horizontal and vertical members 22, 24 may include mounting holes 96 in order to attach additional mounting brackets to the horizontal and vertical members 22, 24.

Figure 6:
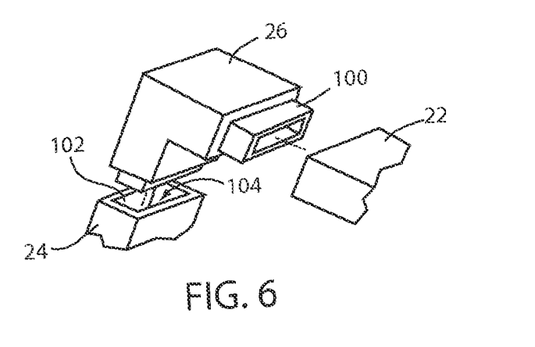
FIG. 6 is a front perspective view of a portion of the modular seatback structure frame of FIG. 5 according to one embodiment of the present invention.

Referring now to the embodiment shown in FIG. 6, the horizontal and vertical members 22, 24 are generally made of steel. However, it is also contemplated that the horizontal and vertical members 22, 24 may be made of any other material that provides the necessary strength and rigidity to the seatback frame 28 as known by one of ordinary skill in the art. Additionally, as illustrated in the embodiment of FIG. 6, the horizontal and vertical members 22, 24 may be hollow members. However, it is also contemplated that the horizontal and vertical members 22, 24 may be solid all the way through in order to provide the necessary strength to the seatback frame 28. As also illustrated in the embodiment of FIG. 6, the horizontal and vertical members 22, 24 may be interchangeably replaced with horizontal and vertical members 22, 24 of different lengths. This customization allows various sizes and shapes of vehicle seating assemblies 20 using the same corner member 26.

As illustrated in the embodiment shown in FIG. 6, the corner member 26 includes at least one male insert portion 100 configured to receive the horizontal or vertical member 22, 24. The male insert portion 100 of the corner member 26 is a generally rectangular insert having a perimeter that is smaller than a perimeter of the corner member 26. The male insert portion 100 of the corner member 26 is generally hollow. However, it is also contemplated that the male insert portion 100 may be a solid portion. It is also contemplated that the male insert portion 100 may be of any other shape as known by one of ordinary skill in the art. Moreover, the corner member 26 includes two male inserts 100. Each male insert 100 is configured to receive one of the horizontal member 22 or the vertical member 24.

Referring again to the embodiment illustrated in FIG. 6, the horizontal and vertical members 22, 24 include at least one female slot portion 102 on an interior 104 of the horizontal and vertical members 22, 24, which is configured to receive the male insert portion 100 of the corner member 26. Each horizontal and vertical member 22, 24 includes the female slot portion 102 on each distal end. The male insert 100 of the corner member 26 and the female slot 102 of the horizontal and vertical members 22, 24 are configured to snap-fit together such that no welding or other additional attachment means is required to produce the seatback frame 28. Each of the horizontal and vertical members 22, 24, regardless of length, will include the same size female slots 102 such that a horizontal or vertical member 22, 24 of any length can be engaged with the male insert portion 100 of the corner member 26 and define the seatback frame 28.

Figure 7:
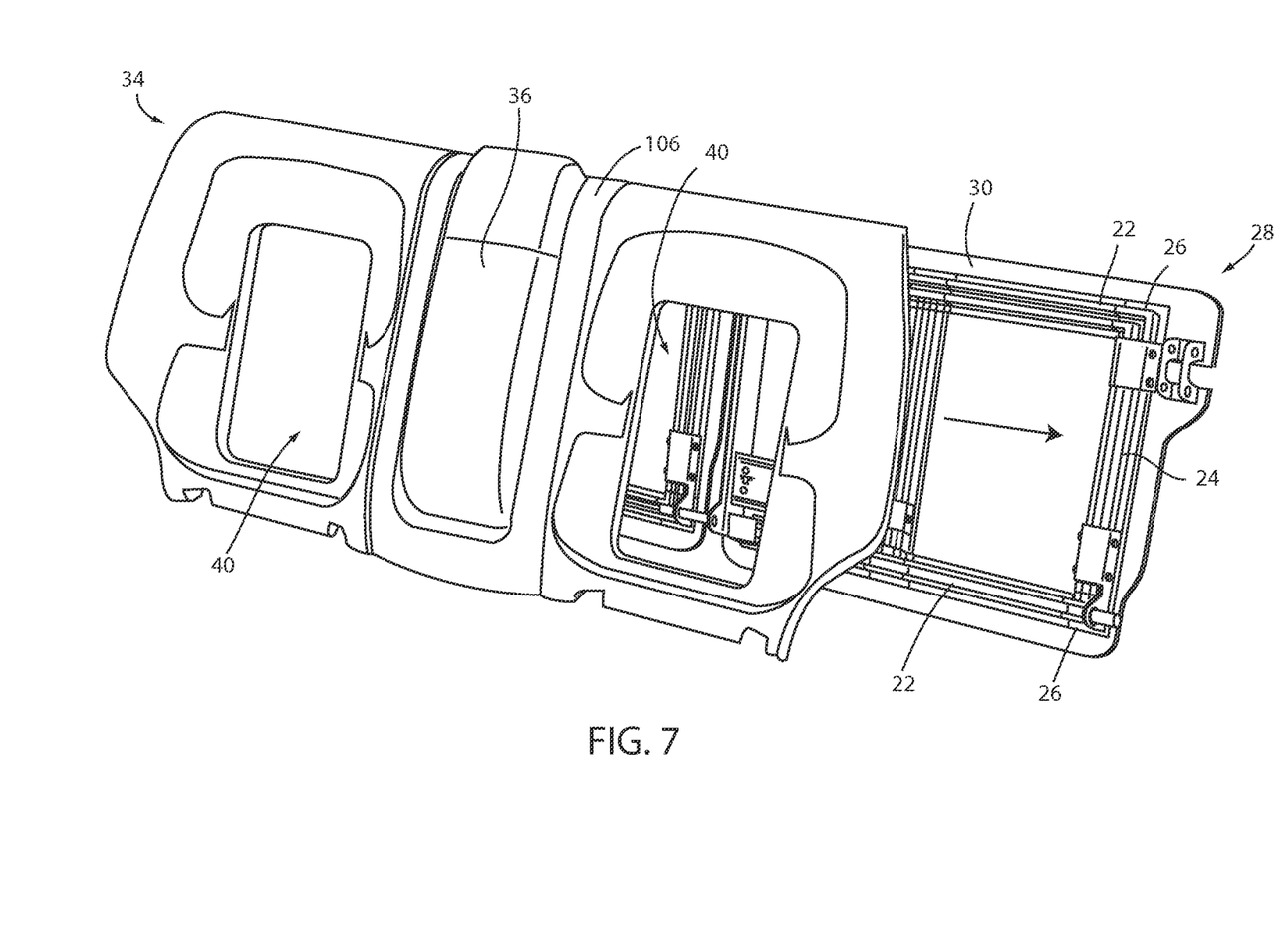
FIG. 7 is a partially-exploded front perspective view of a subassembly for use with a modular seat structure frame according to one embodiment of the present invention.

Referring now to the embodiment shown in FIG. 7, the subassembly 34 is disposed over the seatback frame 28 and operably coupled to the low pressure compression molded back panel 30. The subassembly 34 is generally made of a polyurethane foam. However, it is also contemplated that the subassembly 34 may be made of another type of foam, such as memory foam, or other foam as known by one of ordinary skill in the art. Moreover, the subassembly 34 includes a trim piece 106 which is disposed over a center portion 108 of the seatback frame 28. The trim piece 106 further defines the center seatback 36. The subassembly 34, and more specifically the trim piece 106, may also include a wire structure disposed inside of the trim piece 106 in order to obtain extra rigidity to the subassembly 34, and ultimately, the vehicle seating assembly 20. However, it is also contemplated that the subassembly 34 may be made of just foam and may not include wire or other materials. The subassembly 34 is disposed over the seatback frame 28 and is in abutting contact with the low pressure compression molded back panel 30.

Figure 8:
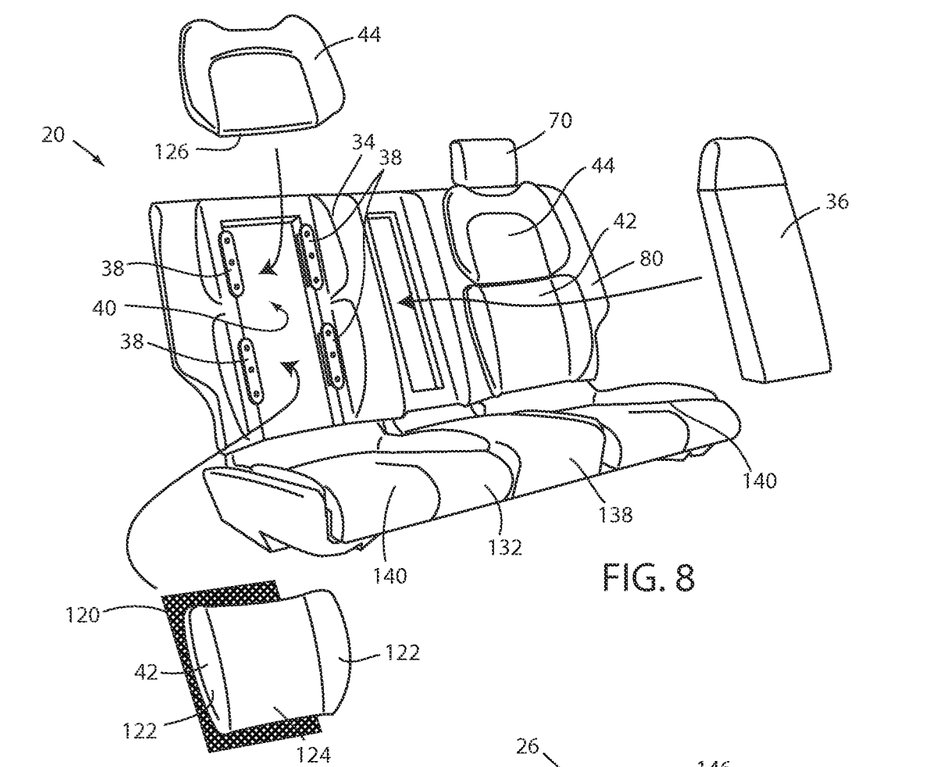
FIG. 8 is a partially exploded front perspective view of a seat cushion insert and subassembly for use with a modular seat structure frame according to one embodiment of the present invention.

Referring now to the embodiment shown in FIG. 8, the subassembly 34 also includes at least one, and usually multiple, cushion attachment supports 38. The cushion attachment supports 38 are disposed adjacent to the open section 40. The attachment supports 38 may be disposed around a perimeter of the open section 40 and more specifically directly above the seatback frame 28. The cushion attachment supports 38 may be steel attachment supports such that mechanical connection of the cushion attachment supports 38 is required. However, it is also contemplated that the cushion attachment supports 38 be Velcro® or other type of fixing means as known by one of ordinary skill in the art, that would be stable enough to withstand the movement of the vehicle 50 while allowing the attachment of the seatback cushion insert 42 to by non-mechanical, and repositionable means.

Referring again to the embodiment shown in FIG. 8, the seatback cushion insert 42 is disposed over each of the open sections 40 on either side of the center seatback 36 and defines the side seatback 44. The seatback cushion insert 42 is operably coupled to the cushion attachment support 38 in order to be securely held onto the vehicle seating assembly 20. The seatback cushion insert 42 is generally made of polyurethane foam. However, it is also contemplated that the seatback cushion insert 42 may be made of a memory foam or other soft foam as known by one of ordinary skill in the art. Additionally, similar to the trim piece 106 of the subassembly 34, the seatback cushion insert 42 may also include a wire structure disposed inside of the seatback cushion insert 42 in order to provide additional rigidity to the vehicle seating assembly 20. However, it is also contemplated that the seatback cushion insert 42 is made only of foam and does not include any metal structure.

Referring again to the embodiment shown in FIG. 8, the seatback cushion insert 42 may be a generally rectangular seat cushion insert similar to a standard vehicle seat cushion. However, as shown in the embodiment illustrated in FIG. 8, the seatback cushion insert 42 may include a suspension 120, a bolster 122, and a seatback 124 surface molded together as one integral unit. It is also contemplated that the seatback cushion insert 42 may include specialized features, such as a climate control system, or cushion extensions. Moreover, the seatback cushion insert 42 may be easily removable such that one seatback cushion insert 42 may be removed and replaced with a seatback cushion insert 42 having a different or additional functionality. Additionally, a bottom surface 126 of the seatback cushion insert 42 may also include the cushion attachment supports 38, such as Velcro® strips or other adhering strips. However, as described above, it is also contemplated that the bottom surface 126 of the seatback cushion insert 42 may include brackets or other affixing means in order to securely hold the seatback cushion insert 42 onto the vehicle seating assembly 20.

Referring again to the embodiment shown in FIG. 8, the suspension 120 may be disposed between the low pressure compression molded back panel 30 and the seatback cushion insert 42. The suspension 120 is disposed completely over the open section 40 and is configured to provide additional comfort to the vehicle passenger. Moreover, the suspension 120 provides the necessary rigidity such that the seatback cushion insert 42 does not collapse under the weight of the vehicle passenger.

Figure 9:
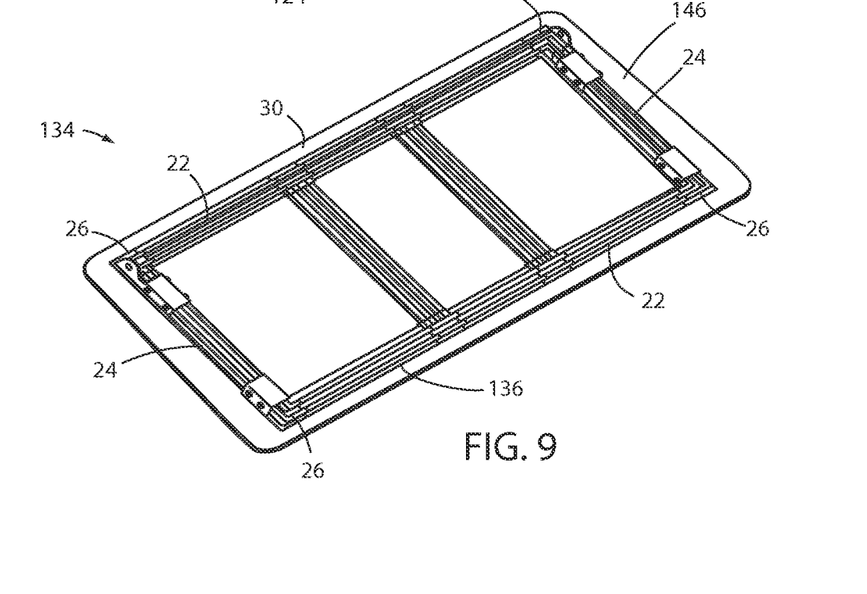
FIG. 9 is a top perspective view of a modular seat structure frame according to one embodiment of the present invention.
Figure 10:
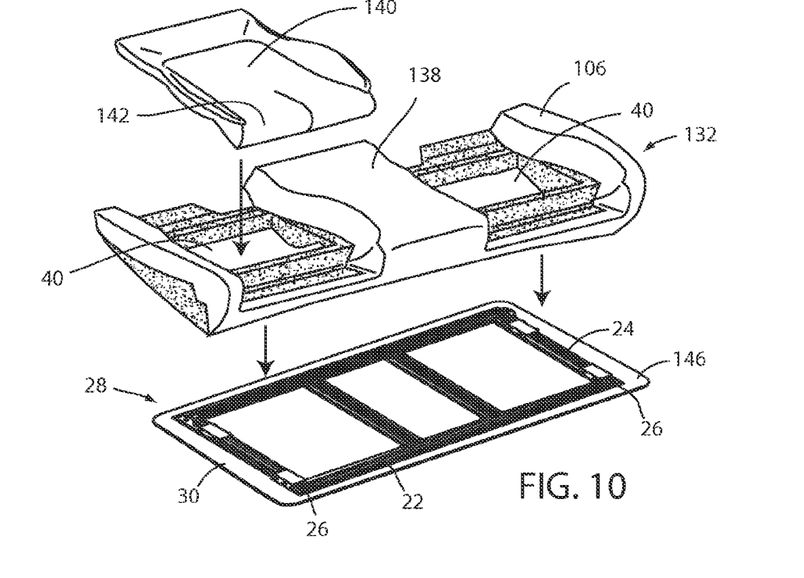
FIG. 10 is a partially exploded front perspective view of the seat cushion insert and subassembly according to another embodiment of the present invention.
Figure 11:
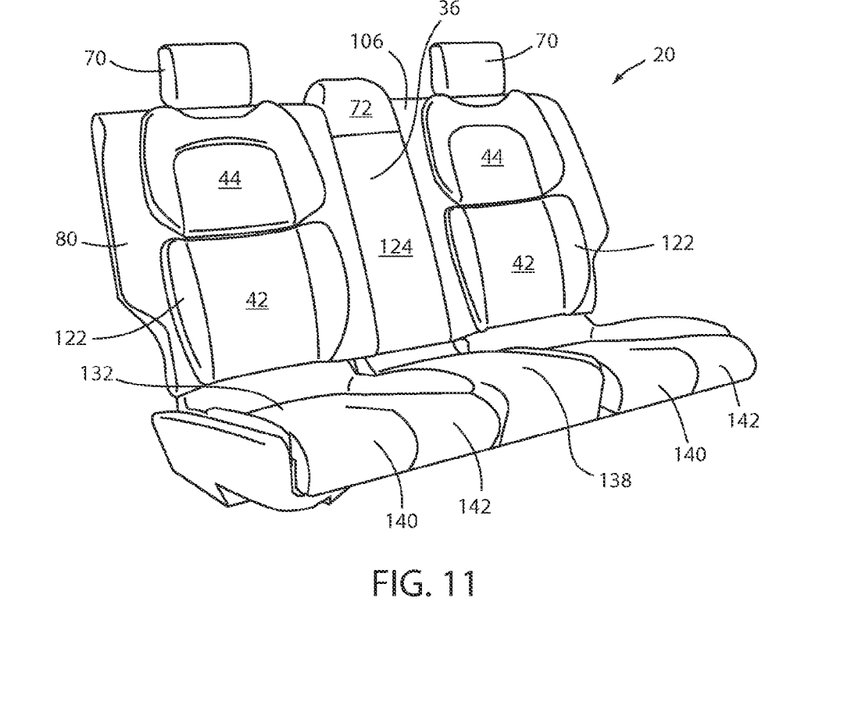
FIG. 11 is a front perspective view of the modular seat structure frame having the subassembly and seat cushion inserts disposed over the modular seatback and seat structure frame according to one embodiment of the present invention.

Referring now to the embodiment shown in FIGS. 9-11, a seat base portion 132 of the vehicle seating assembly 20 may include many of the same features as described above with respect to the seatback portion 80, including the plurality of horizontal members 22, the plurality of vertical members 24, and the plurality of corner members 26. Moreover, the plurality of corner members 26 are operably coupled with the plurality of horizontal members 22 and the plurality of vertical members 24 via a snap-fit engagement and define a seat base frame 134. Additionally, the low pressure compression molded back panel 30 may be disposed on an underside 136 of the seat base frame 134. The molded back panel 30 provides the strength and support necessary to support the weight of the vehicle passenger and also acts as a closeout finished panel to the seat base portion 132. Similar to the embodiment shown in FIG. 4, the back panel 30 may be affixed to the seat base frame 134 using brackets or other methods as known by one of ordinary skill in the art.

Referring again to the embodiments shown in FIGS. 9-11, the subassembly 34 may be disposed over the low pressure compression molded back panel 30 and the seat base frame 134 in order to define a center seat base 138. Adjacent to the center seat base 138 are the two open sections 40. At least one cushion attachment support 38 is disposed adjacent to the at least one open section 40, as described above with respect to the seatback frame 28. Additionally, a seat base cushion insert 140 is disposed over the open section 40 and defines the side seat base 134. The seat base cushion insert 140 may include many of the same features as described above with respect to the seatback cushion insert 42, including the suspension 120, the bolster 122, and the seating surface 124 molded together as one integral unit. However, it is also contemplated that the seat base cushion insert 140 may be customized such that the seat base cushion insert 140 includes thigh inserts 142, such as thigh bolsters, thigh inserts, thigh extensions, cushion extensions, or other inserts, such as a climate control system or split leg supports. Together, the seat base portion 132 as described above, and the seat back portion 80 define the vehicle seating assembly 20.

Referring again to the embodiment shown in FIGS. 9-11, in operation, the plurality of horizontal members 22 and the plurality of vertical members 24 are joined together with the plurality of corner members 26 via a snap-fit engagement in order to define the seatback frame 28. The low pressure compression molded back panel 30 is operably coupled to the rear 32 of the seatback frame 28 and provides structural rigidity and acts as a close out finish panel for the vehicle seating assembly 20. The subassembly 34 is disposed over the low pressure compression molded back panel 30 and defines the center seatback 36. The subassembly 34 also includes at least one cushion attachment support 38 disposed adjacent to the center seatback 36. The subassembly 34 includes the trim piece 106, which is integrally formed on the subassembly 34 and defines the center seatback 36. The subassembly 34 also defines the at least one open section 40 on either side of the center seatback 36. The at least one seatback cushion insert 42 is operably coupled and usually fixedly coupled to the at least one cushion attachment support 38 in order to attach the seatback cushion insert 42 to the vehicle seating assembly 20. The seatback cushion insert 42 is disposed over the open section 40 and defines the side seatback 44. Moreover, the seat base portion 132 of the vehicle seating assembly 20 is formed similar to the embodiment described above including the plurality of horizontal and vertical members 22, 24 joined by a snap-fit engagement to the plurality of corner members 26 defining the seat base frame 134. Additionally, the seat base portion 132 includes a low pressure compression molded bottom panel 146, the subassembly 34, the cushion attachment support 38, and the seat base cushion insert 140. The seat base cushion insert 140 may include single thigh inserts 142, which may include right and left thigh inserts or thigh inserts configured to tilt or extend in order to provide increased comfort to the vehicle passenger. It is also contemplated that the vehicle seating assembly 20 may include a climate control system, a heater mat, or other functional elements disposed between the low pressure compression molded back panel 30 and the seat base cushion insert 140.

Yet another aspect of the present invention is to provide a method of creating a modular rear seat structure frame which allows easy customizability during manufacturing in order to increase value to the vehicle passenger. Prior art vehicle seat frames include a welded steel back frame design which forces use of a single structure across many vehicle lines which limits functionality and flexibility to the consumer. The vehicle seating assembly 20 of the present invention includes interchangeable horizontal and vertical members 22, 24 of various lengths in order to provide different size vehicle seating assemblies 20 for various vehicle types. This allows a single manufacturing plant to produce multiple sizes of vehicle seating assemblies 20 in a single location. Moreover, the low pressure compression molded back panel 30 and subassembly 34 along with seat cushion inserts 42 allow additional functionality and other customizable features to be easily integrated into the vehicle seating assembly 20.

It is to be understood that variations and modifications can be made on the aforementioned structure without departing from the concepts of the present invention, and further it is to be understood that such concepts are intended to be covered by the following claims unless these claims by their language expressly state otherwise.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seating assembly comprising:
    a plurality of horizontal members, a plurality of vertical members and a plurality of corner members defining a seat frame supporting first and second side seats and a center seat, wherein each corner member is configured to snap-fit into at least one horizontal member and one vertical member;
    a seatback panel disposed behind the seat frame;
    a low-pressure compression molded member disposed over the seat frame and defining at least one open section;
    a subassembly disposed over the compression molded member and defining the center seat, the subassembly also including at least one cushion attachment support disposed adjacent to the at least one open section; and
    a seat cushion insert operably coupled to the at least one cushion attachment support and disposed over the at least one open section and defining one of the first and second side seats.

2. The vehicle seating assembly of claim 1, wherein the corner members further include at least one male insert portion.

3. The vehicle seating assembly of claim 2, wherein the vertical members and the horizontal members include at least one female slot portion which engages with the male insert portion of the corner member.

4. The vehicle seating assembly of claim 1, wherein the vertical members can be interchangeable vertical members of various length.

5. The vehicle seating assembly of claim 1, further comprising a suspension mat disposed between the low-pressure compression molded member and the seat cushion insert.

6. The vehicle seating assembly of claim 1, wherein the horizontal members can be interchangeable horizontal members of various length.

7. The vehicle seating assembly of claim 1, wherein the subassembly is comprised of polyurethane foam.

8. A vehicle seating assembly comprising:
    a seat frame supporting a seatback and including a horizontal member snap-fitted to a vertical member by a corner member;
    a compression molded member disposed behind the seat frame;
    a subassembly disposed over the seat frame and compression molded member, defining two side seats and a center seat, the subassembly including a cushion attachment support; and
    seat cushion inserts coupled to the cushion attachment support proximate the side seats.

9. The vehicle seating assembly of claim 8, wherein the corner members further include at least one male insert portion.

10. The vehicle seating assembly of claim 9, wherein the vertical members and horizontal members include at least one female slot portion which engages with the male insert portion of the corner member.

11. The vehicle seating assembly of claim 8, wherein the vertical members can be interchangeable vertical members of various length.

12. The vehicle seating assembly of claim 8, wherein the horizontal members can be interchangeable horizontal members of various length.

13. The vehicle seating assembly of claim 8, further comprising a suspension mat disposed between the compression molded member and the seat cushion insert.

14. The vehicle seating assembly of claim 8, wherein the subassembly further includes a trim piece integrally formed on the subassembly.

15. The vehicle seating assembly of claim 8, wherein the subassembly is comprised of polyurethane foam.

16. A vehicle seating assembly comprising:
    a seat frame including horizontal and vertical members having a receiving slot for receiving an insert portion of a corner member;
    a compression molded member coupled with a back of the seat frame;
    a subassembly abutting the compression molded member and defining a center seat;
    attachment supports disposed on the subassembly; and
    cushion inserts coupled to the attachment supports to define side seats.

17. The vehicle seating assembly of claim 16, wherein the receiving slot engages with the insert portion of the corner member.

18. The vehicle seating assembly of claim 16, wherein the vertical members can be interchangeable vertical members of various length.

19. The vehicle seating assembly of claim 16, wherein the horizontal members can be interchangeable horizontal members of various length.

* * * * *